UNITED STATES PATENT OFFICE.

PETER FIREMAN, OF ALEXANDRIA, VIRGINIA, ASSIGNOR OF ONE-HALF TO EDWARD G. PORTNER, OF WASHINGTON, DISTRICT OF COLUMBIA.

MANUFACTURE OF PRINTING-INK PIGMENTS.

No. 802,928.   Specification of Letters Patent.   Patented Oct. 24, 1905.

Application filed January 19, 1905. Serial No. 241,887.

*To all whom it may concern:*

Be it known that I, PETER FIREMAN, a citizen of the United States, residing in Alexandria, county of Alexandria, Virginia, have invented certain new and useful Improvements in the Manufacture of Printing-Ink Pigments; and I do hereby declare the following to be a full, clear, and exact description of the invention, such as will enable others skilled in the art to which it appertains to make and use the same.

As is well known, black printing-inks consist, essentially, of two constituents—an oily vehicle and a black pigment.

The lack of uniformity in the physical properties of carbon-black, (known under various other names—such as "lampblack," "vegetable-black," &c.,) the pigment universally used in black printing-inks, and the resulting uncertainty in the working quality of the black printing-inks is a great obstacle in the way of bringing on the market a good ink of moderate price. In the ink to be hereinbelow described these disadvantages are in a great measure overcome by replacing the carbon-black by a complex product or pigment made up of precipitated black magnetic ferro-ferric oxid prepared by a new and improved process. The regular commercial manufacture of this pigment (which if it has ever before been produced was the result of accident) is the main subject of my invention, which I shall now proceed to describe.

I start out with a ferrous salt which I first dissolve in water to make up a rather dilute solution. The waste ferrous liquors obtained by pickling sheet-iron, &c., would be quite suitable. The solution contained in a tank is then at once completely precipitated in the cold by carbonate of soda added in slight excess. The precipitation can also, if preferred, be made with caustic soda or some other soluble hydroxid or carbonate. Immediately after the addition of the precipitating agent has been begun heat is applied and a rapid current of air is introduced, which stirs up the liquid and the precipitate most energetically. The air is injected at the bottom of the tank and by issuing out of the delivery-pipe through a considerable number of apertures is divided into numerous streams. The heat is so regulated that the temperature quickly rises to between 80° and 90° centigrade. Under these conditions the precipitated ferrous carbonate or hydroxid is very rapidly oxidized. The operation is terminated by bringing the liquid, after the air has been shut off, to boiling and maintaining it for a few minutes at that temperature. The progress of the oxidation is accompanied by certain changes in the appearance of the mixture in the tank. The precipitate, which is at first light green, quickly turns darker and darker, causing the entire mixture after rapidly passing through different shades of green and blue to soon become a deep brown-black. Samples taken from time to time and spread on porcelain are at the earlier stages green, next blue, then brown, and at the final stages deep brown-black. We come now to the very important question, When should the admission of air be discontinued? As long as this question remained undetermined many of my experiments failed and only occasionally at long intervals would a satisfactory product be unexpectedly obtained. Finally I conceived the idea of analyzing the product at the various stages of the process, seeking, however, to determine not the absolute quantities of its constituents, which was impossible, (since for that purpose it would have been necessary to start out with a weighed sample, whose preparation would have involved its washing, filtering, and drying, during which operations it undergoes great changes,) but only their relative proportions. To do this, a sample is taken out at a given stage of oxidation, dissolved in dilute sulfuric acid, and the ferrous and ferric iron are determined by titration with potassium permanganate in the usual way. With the aid of this analytical method it was soon found that no matter at what stage of oxidation the blowing in of air had been stopped the product continued to undergo oxidation to a very great extent during the subsequent filtering, washing, and drying—chiefly during the drying—even if carried out at temperatures not exceeding 60° centigrade. This explained how a product of a fine black color immediately after the oxidation in the precipitation-tank became reddish-brown on drying. The oxidation by the current of air in the tank had been allowed to proceed too far. On the other hand, it was found that there was such a thing in my process as insufficient oxidation. If the oxidation by the current of air had been stopped too soon, the product turned rusty brown during the washing and more so during the drying, the oxidation in this case tending to the formation of a ferric rather than of a ferro-ferric compound. The analytical method also explained how a product of not such a good black color in the precipitation-tank could yield a good pigment in the end. It meant that the oxidation in this instance was sufficiently advanced to avoid the tendency to form the rusty-brown ferric compound and yet not too far advanced to pass beyond the stage of the black ferro-ferric pigment by taking up new oxygen in drying. It meant here that the product underwent during the drying a kind of ripening process. In brief, it became evident that only when the oxidation by the current of air in the precipitation-tank was not allowed to fall below or to exceed certain more or less narrowly-prescribed limits was there the possibility (but then also the certainty) of obtaining the desired black ferro-ferric oxid. These limits are defined thus: The ratio of the ferrous to the ferric iron in the oxidized precipitate in the tank should be from 1 to 0.8 to one to one. Then the pigment after drying will be at its best and contain the ferrous and ferric iron in the ratio of 1 to 2.3 to one to three. While these values indicate the correct conditions for the production of the pigment in question, they should not be taken too rigidly, and small deviations from them are permissible without jeopardizing the result. It must be emphasized, however, that the above values are good working values under the condition that the drying takes place at a temperature of about 60° in the open air. It has been seen that the ferro-ferric oxid undergoes considerably more oxidation during the drying than in its treatment in the precipitation-tank by the current of air. It is evident, therefore, that if we can moderate or entirely prevent oxidation during the drying we can allow considerably more of it to be accomplished by the current of air in the precipitation-tank. Moreover, since the latter mode of oxidation is under much better control than oxidation in the air during the drying operation it appeared advantageous to conduct the drying with a more or less complete exclusion of air. Guided by these considerations a number of different modes of drying have been adopted in which the desiccation takes place either in practically the entire absence of air or with a very limited supply of it. The best mode of drying proved to be the following: The washed and pressed precipitate is placed within a closed iron cylinder provided with a tube, to which a valve is attached to allow the water-vapor to escape, but to prevent the air from coming in. This cylinder is inclosed in a wider one. The heating takes place by means of steam passing between the two cylinders. Making use of superheated steam, a temperature of 150° centigrade or more is conveniently maintained. Under these conditions the pigment dries expeditiously and practically without oxidation. In this way a beautiful black pigment is easily obtained with a composition not deviating much from that of the mineral magnetic oxid, and to accomplish this result the product in the precipitation-tank is allowed to become oxidized by the current of air until the ratio of ferrous to ferric iron nearly reaches that of one to two. Very good results are also obtained by drying in a chamber from which the air is withdrawn by a vacuum-pump. The exhaustion need not be high to effectively prevent oxidation. Here also the oxidation by the current of air in the precipitation-tank can be allowed to proceed until the ratio of the ferrous to the ferric iron is not far from that of one to two. Other modes of drying have been made use of by me and may be found at times advantageous; but in all cases the degree of oxidation permissible before drying (in the precipitation-tank by the current of air) must be determined by the amount of oxidation unavoidable in the drying process adopted. I may say, further, that in the oxidation of the solid precipitate in the tank air is blown in until from the color and general appearance it is judged that the oxidation has proceeded sufficiently far, (and, after some experience, in conjunction with analysis, this point can be fixed with reasonable certainty,) whereupon the operation is interrupted and a final sample analyzed. This analysis need not take in all more than ten minutes, and, according to the values obtained, the oxidation is either continued or stopped. The filtering and washing is conducted in any well-known way.

The precipitated magnetic ferro-ferric oxid prepared by my process described above possesses a valuable black color of a high degree of permanence and is at its best in these respects so long as it is prepared to contain ferrous and ferric iron in the ratio of from one to two to 1 to 2.5. Being produced by a precipitation method, it is easily reduced to an impalpable powder, which mixes perfectly with the varnish. An ink is thus produced of very high working quality, well suited for printing and engraving and for the very exacting half-tone impressions, for which latter use the most black inks fail utterly. Being thus produced by a chemical reaction under accurately-defined conditions, these conditions being well under control, it possesses uniform physical properties and imparts to the printing-ink a uniform working quality. To make the ink, it is merely necessary to mix it in the usual way with the varnish (linseed or rosin oil) in such quantity as to obtain the desired consistency.

What I claim is—

1. The method of making a precipitated magnetic black ferro-ferric oxid which conisists in dissolving a ferrous salt, precipitating the salt by a substance having an alkaline reaction, oxidizing the precipitate by a current of air, regulating the degree of oxidation according to the amount of oxidation unavoidable in the subsequent drying, and then filtering, washing and drying it; substantially as described.

2. The method of making a precipitated magnetic black ferro-ferric oxid, which consists in dissolving a ferrous salt, precipitating the salt by a soluble hydroxid, oxidizing the precipitate by a current of air, regulating the degree of oxidation according to the amount of oxidation unavoidable in the subsequent drying, and then filtering, washing and drying it; substantially as described.

3. The method of making a precipitated magnetic black ferro-ferric oxid which consists in dissolving a ferrous salt, precipitating the salt by a substance having an alkaline reaction, oxidizing the precipitate by a current of air, ascertaining the degree of oxidation by analysis of samples taken from time to time and terminating it when the desired degree of oxidation is reached, and then filtering, washing and drying it; substantially as described.

4. The method of making a precipitated magnetic black ferro-ferric oxid which consists in dissolving a ferrous salt, precipitating the salt by a substance having an alkaline reaction, oxidizing the precipitate by a current of air until the ratio of the ferrous to the ferric iron is within the limits of about 1 to 0.8 to one to two, and then filtering, washing and drying it; substantially as described.

5. The method of making a precipitated magnetic black ferro-ferric oxid which consists in dissolving a ferrous salt, precipitating the salt by a substance having an alkaline reaction, oxidizing the precipitate by a current of air, and then filtering, washing and drying it with the exclusion of air; substantially as described.

6. The method of making a precipitated magnetic black ferro-ferric oxid which consists in dissolving a ferrous salt, precipitating the salt completely in the cold by a substance having an alkaline reaction, oxidizing the precipitate by a current of air, and finally filtering, washing and drying it *in vacuo;* substantially as described.

7. The process of drying precipitated ferro-ferric oxid of the composition described, which consists in carrying on the drying operation with the exclusion of air; substantially as described.

8. Dry precipitated magnetic ferro-ferric oxid, in which the ratio of the ferrous to the ferric iron is within the limits of about one to two to one to three; and which when rubbed on white paper will leave a black impression without brown streaks and when mixed with a suitable varnish will print a decided black; substantially as described.

In testimony whereof I affix my signature in presence of two witnesses.

PETER FIREMAN.

Witnesses:
JOHN C. PENNIE,
CHAS. J. O'NEILL